| United States Patent [19] | [11] Patent Number: 4,835,843 |
|---|---|
| Wendt et al. | [45] Date of Patent: Jun. 6, 1989 |

[54] AUTOMATIC BADGE MAKING MACHINE

[75] Inventors: David W. Wendt, Monona; Robert W. Higbee, Madison; Alan E. Kemp, Janesville; Ed Gisske, Verona, all of Wis.

[73] Assignee: Badge-A-Minit, Ltd., LaSalle, Ill.

[21] Appl. No.: 178,552

[22] Filed: Apr. 7, 1988

[51] Int. Cl.⁴ .............................................. B23P 11/00
[52] U.S. Cl. .................................... 29/708; 29/243.52
[58] Field of Search ...................... 29/243.52, 706, 708; 40/1.5; 241/37.5

[56] References Cited

U.S. PATENT DOCUMENTS

| 3,419,223 | 12/1968 | Morin | 241/37.5 X |
| 3,600,783 | 8/1971 | Krinsky | 29/243.52 |
| 4,200,243 | 4/1980 | Peterson, Jr. | 241/37.5 X |
| 4,696,086 | 9/1987 | Dickerson | 29/243.52 |

*Primary Examiner*—Timothy V. Eley
*Attorney, Agent, or Firm*—Mason, Kolehmainen, Rathburn & Wyss

[57] ABSTRACT

An automatic badge making machine comprises a die assembly including a first and second die set relatively movable to form a badge or button from a plurality of badge parts initially placed in one of the die sets. A motor powered drive is provided for relatively moving one of the die sets in an operating cycle comprising a plurality of successive strokes toward and away from the second die set to shape and form a badge between the facing surfaces. A protective safety shield is provided for movement between an open position exposing a work area to permit access to the die sets for loading-/unloading badge parts/badges and a closed position enclosing the work area during a badge making operating cycle. The shield comprises a component of a safety system provided for preventing operation of the motor whenever the protective safety shield is out of the closed position. The badge maker also includes a circuit for automatically returning the die sets to an open position whenever excessive forces between die sets are encountered during a badge making operating cycle.

31 Claims, 8 Drawing Sheets

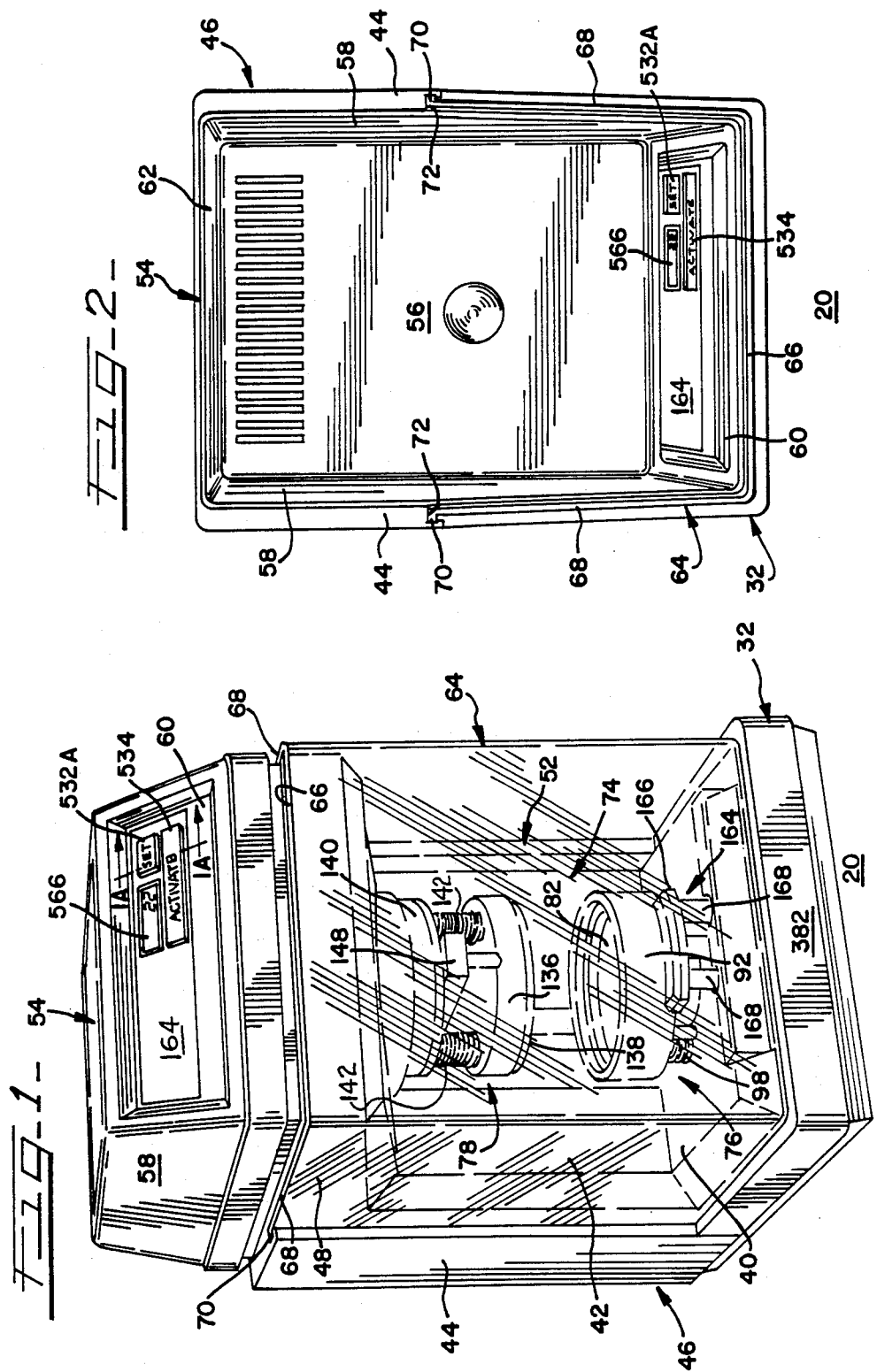

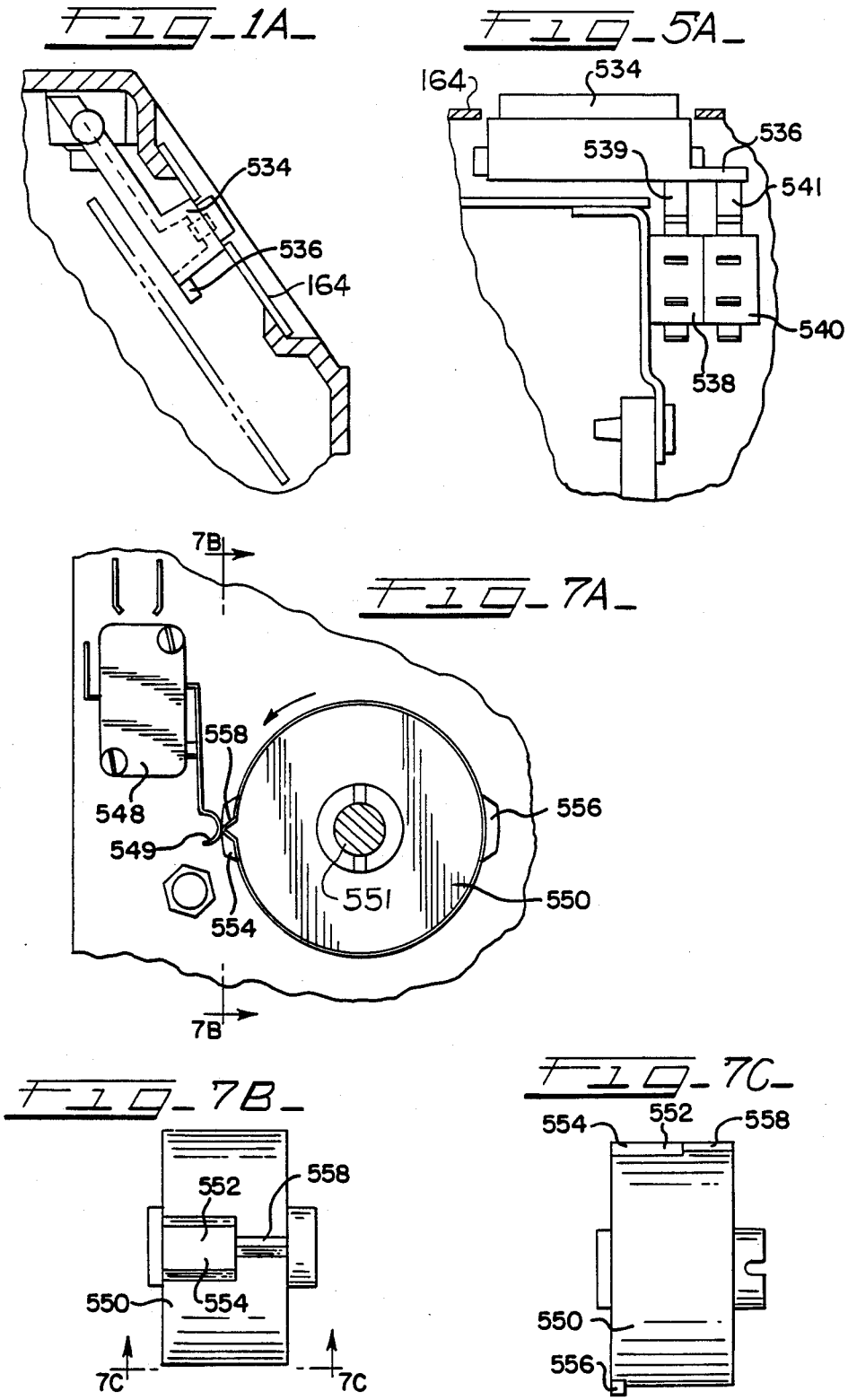

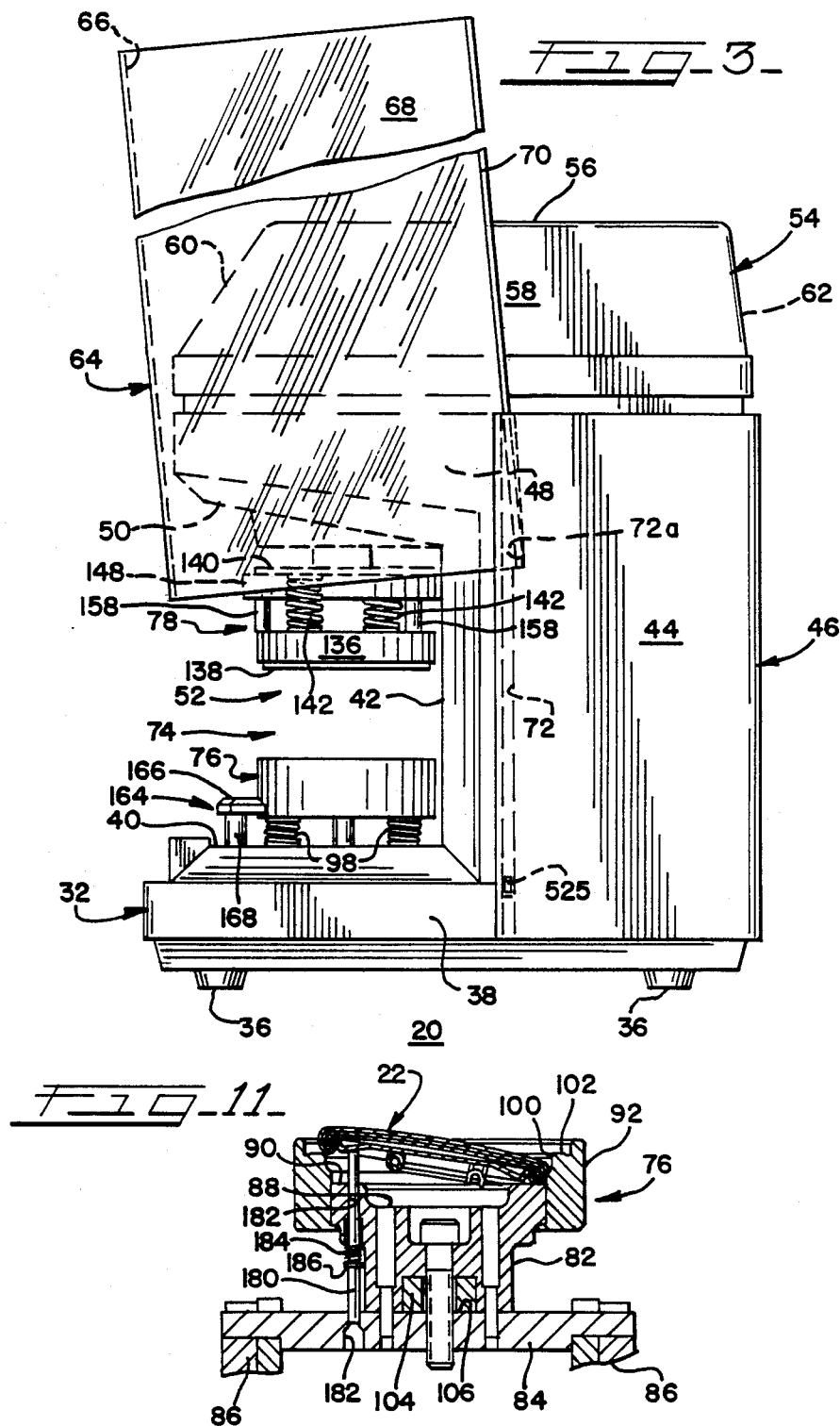

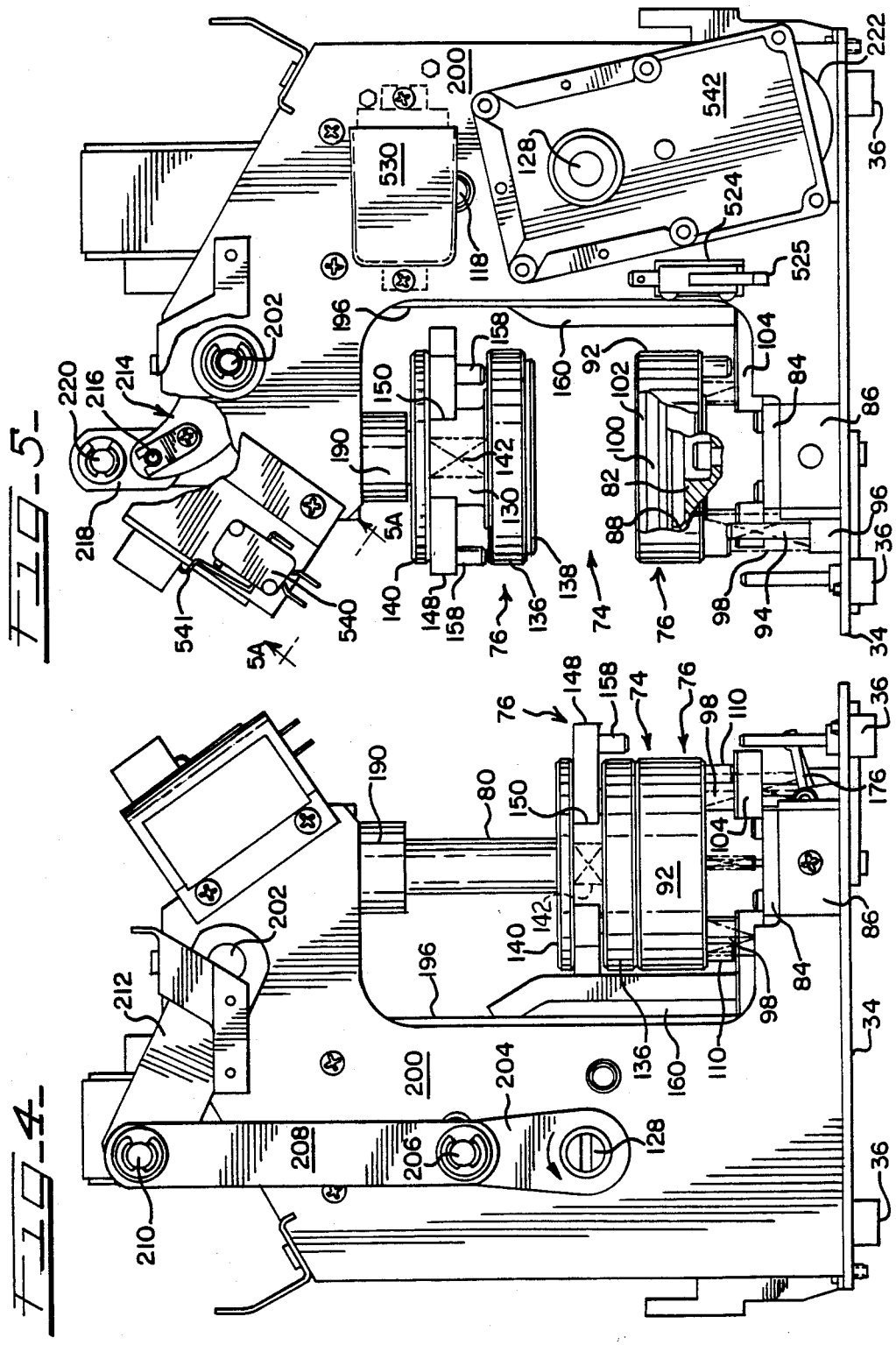

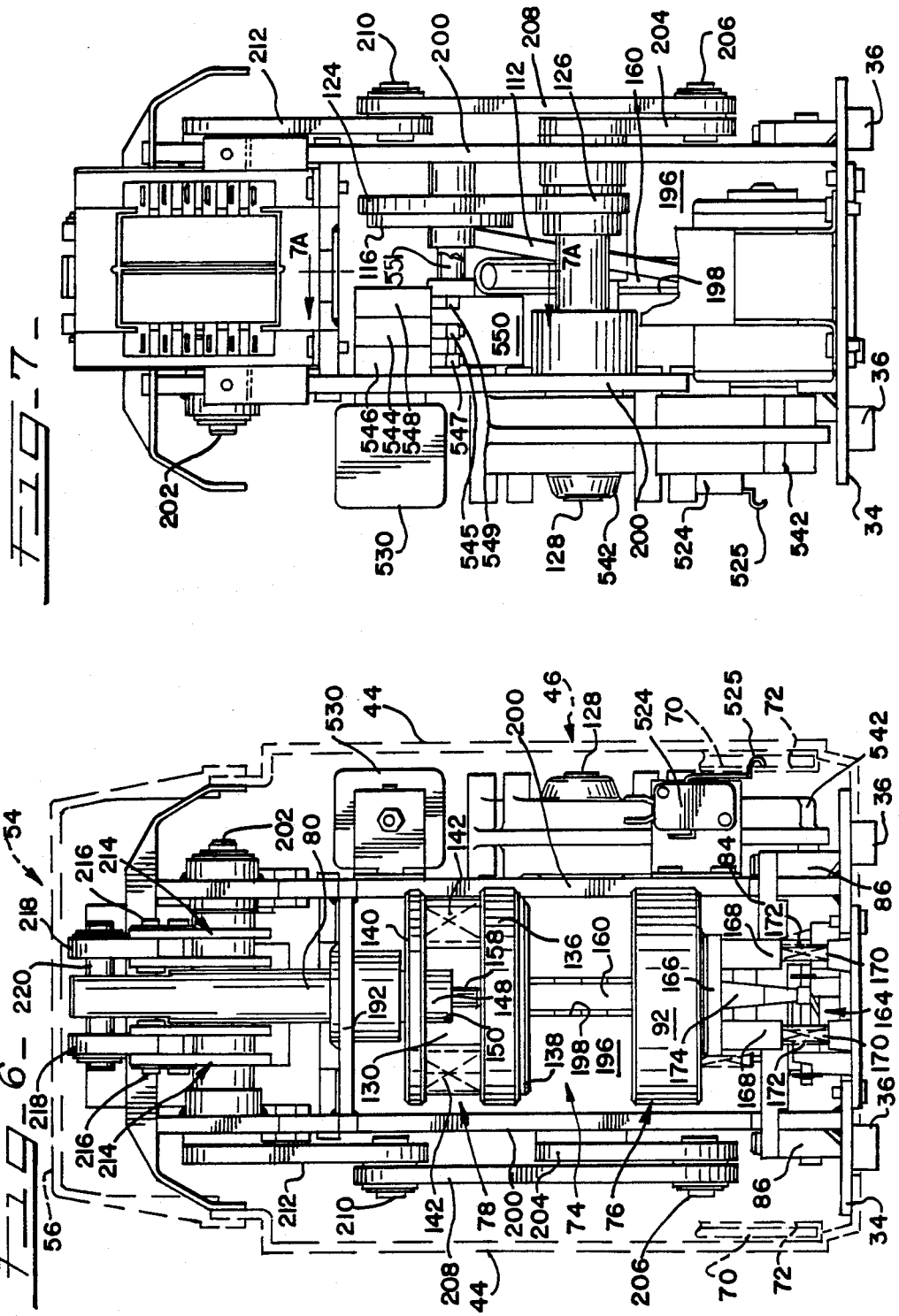

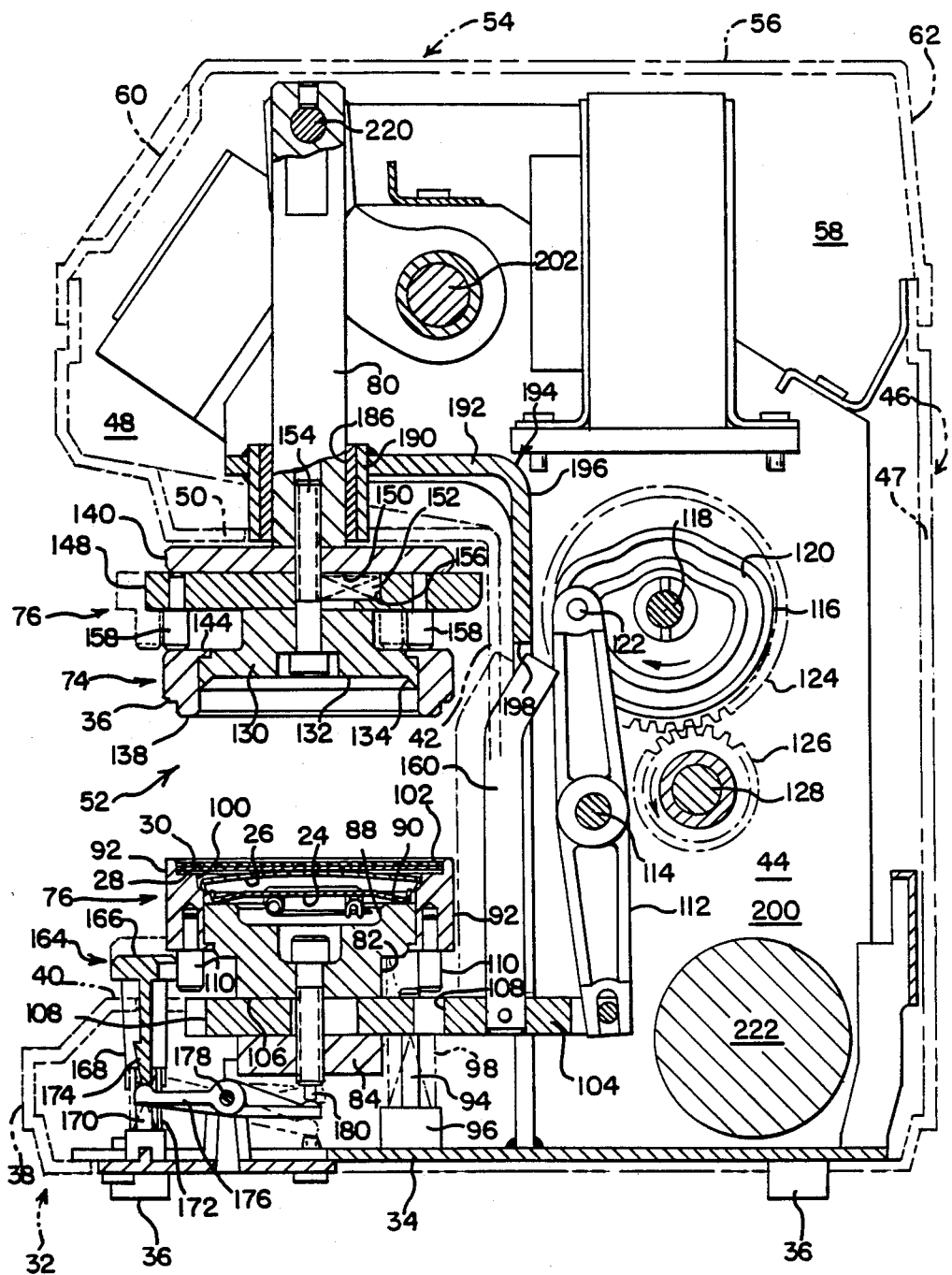
FIG_8

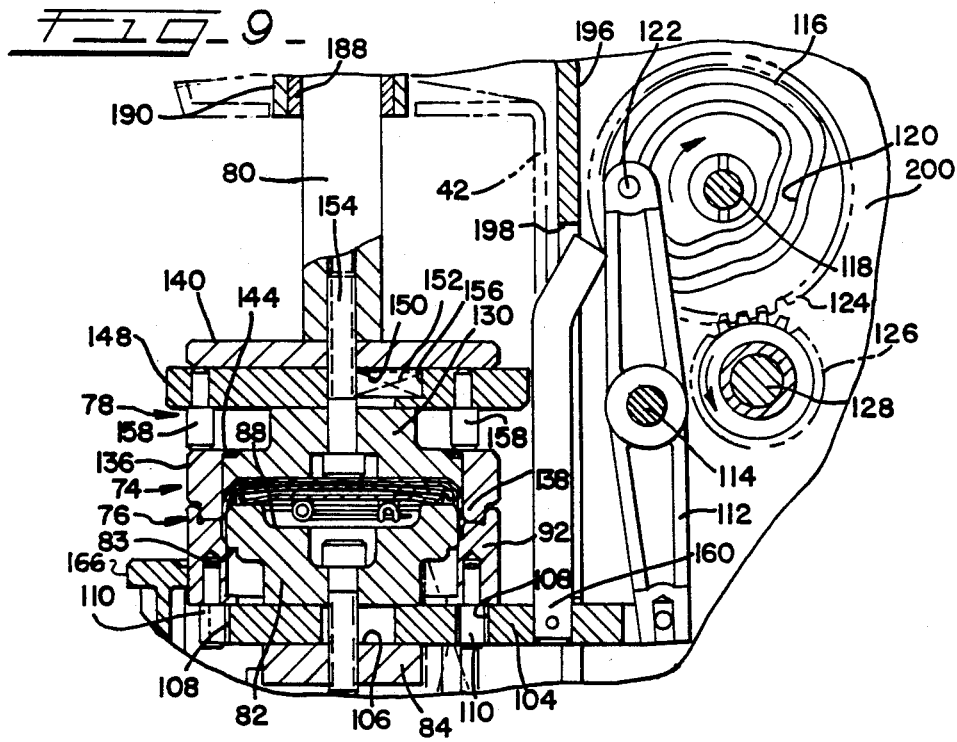
FIG_9
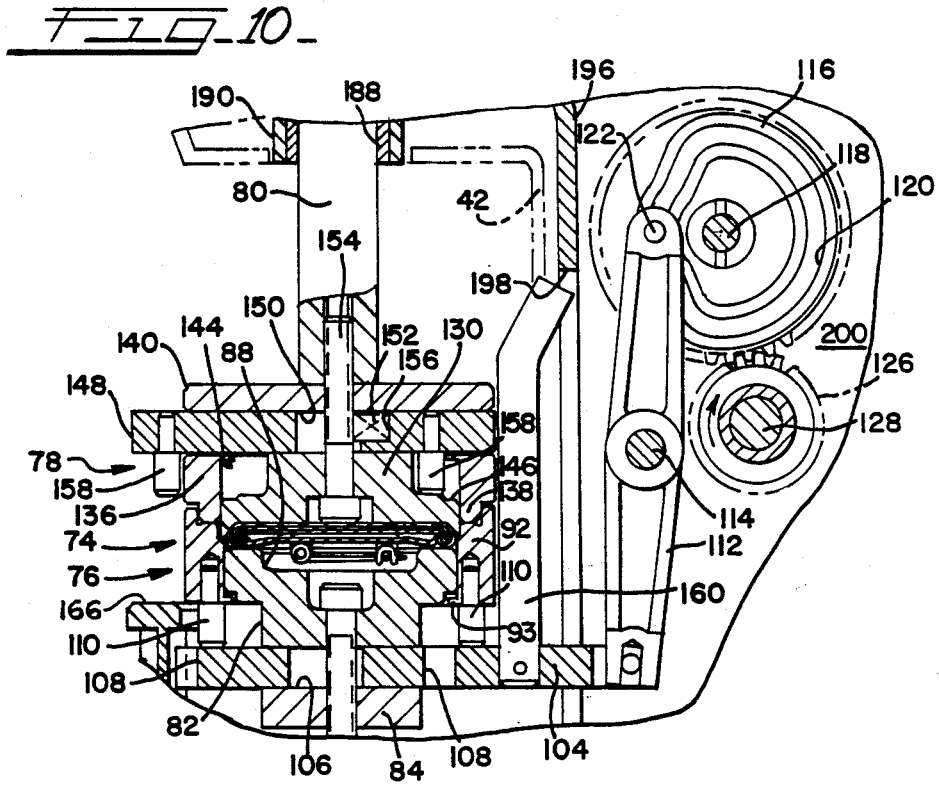
FIG_10

AUTOMATIC BADGE MAKING MACHINE

BACKGROUND OF THE INVENTION

1. Field of the Invention

The present invention relates to an automatic badge making machine and more particularly an automatic badge maker employing a motor driven system for making a badge out of a plurality of badge parts placed in a die assembly of the machine.

2. Background of the Prior Art

U.S. Pat. Nos. Des. 225,031, Des. 254,495, 3,643,530, 3,795,036, 4,299,019, 4,426,781 and 4,532,684 disclose manually actuated badge or button makers and die set assemblies used for making display badges out of badge parts placed in a die assembly. None of these patents, however, disclose a motor driven, automatic badge making machine wherein badges or buttons can be produced at a rapid rate in a safe and efficient manner by merely loading the badge parts into a die assembly and pushing a button.

Accordingly, it is an object of the present invention to provide a new and improved automatic badge making machine employing a motor driven system for moving die members of a die assembly to form a badge from badge parts placed in the die assembly.

It is yet another object of the present invention to provide a new and improved automatic badge making machine of a power operated type which requires little manual effort to make a badge.

Still another object of the present invention is to provide a new and improved automatic badge maker of the character described which includes a unique safety system employing a protective safety cover for closing off a work area of the machine when the die assembly is operating to produce an assembled badge from a plurality of badge parts.

Still another object of the present invention is to provide a new and improved automatic badge maker of the character described which includes a safety system for preventing operation of the badge maker dies unless the safety cover is in a work area enclosing position.

Yet another object of the present invention is to provide a new and improved automatic badge maker of the character described which includes a system for separating apart movable dies of a die assembly at any time excessive die forces are encountered between the dies during any portion of an operating cycle.

Yet another object of the present invention is to provide a new and improved automatic badge maker of the character described which is fast and efficient in operation, neat in appearance and relatively low in cost so as to enable badges or buttons to be produced rapidly on an economical basis.

The foregoing and other objects and advantages of the present invention are accomplished in a preferred illustrated embodiment comprising a new and improved automatic badge maker having first and second relatively movable die sets for consolidating badge parts placed therein into a finished button or badge. Motor driven means is provided for relatively moving the die sets in an operating cycle comprising a plurality of successive strokes toward and away from one another to form a completed badge from individual badge parts placed between facing surfaces of the die sets. A safety cover is provided for enclosing a work area around the die assembly so that the possibility of injury to persons and or objects in the vicinity of the moving dies is minimized. The safety cover is movable between an open position for permitting access to the die sets and a closed position. Whenever the cover is not in the closed position the motor driven system is rendered inoperable for moving the die sets to make a badge.

The automatic badge maker also includes the system for automatically separating apart the movable die sets of the die assembly whenever excessive die forces are encountered during a badge making operation so that jammed or damaged badge parts can be readily removed and to prevent further damage to the badge maker.

BRIEF DESCRIPTION OF THE DRAWINGS

For a better understanding of the present invention, reference should be had to the following detailed description taken in conjunction with the drawings, in which:

FIG. 1 is a front elevational view of a new and improved automatic badge making machine constructed in accordance with the features of the present invention and shown in an operating position with a safety cover in a closed position enclosing a work area around a die assembly;

FIG. 1A is a fragmentary cross-sectional view taken substantially along lines 1A—1A of FIG. 1;

FIG. 2 is a top plan view of the automatic badge making machine;

FIG. 3 is a side elevational view of the automatic badge making machine shown with the safety cover set and retained in an open position for loading and unloading badge parts/badges to and from the die assembly;

FIG. 4 is a side elevational view of one side of the automatic badge making machine illustrated with an outer housing removed;

FIG. 5 is an opposite side elevational view of the badge making machine showing the die assembly in another operative position;

FIG. 5A is a fragmentary cross-sectional view taken substantially along lines 5A—5A of FIG. 5;

FIG. 6 is a front elevational view of the badge making machine shown with the outer housing removed but with portions thereof illustrated in phantom;

FIG. 7 is a rear elevational view of the automatic badge making machine again illustrated with the outer housing removed;

FIG. 7A is a fragmentary cross-sectional view taken substantially along lines 7A—7A of FIG. 7;

Figure 12:
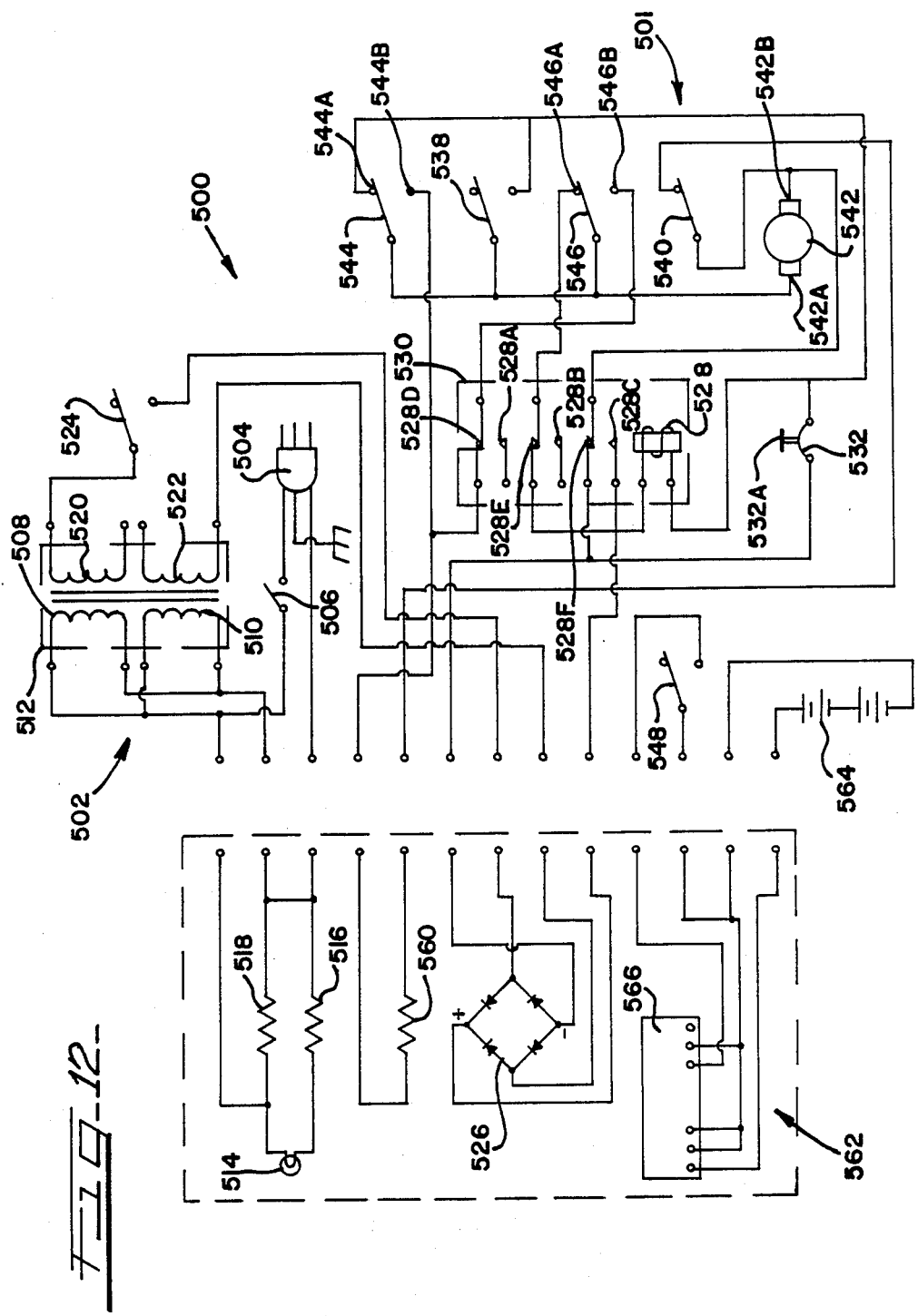

FIB. 7B is a fragmentary cross-sectional view taken substantially along lines 7B—7B of FIG. 7A;

FIG. 7C is a fragmentary cross-sectional view taken substantially along lines 7C—7C of FIG. 7B;

FIG. 8 is a side elevational view of the automatic badge making machine with portions illustrated in cross-section and showing a set of badge parts placed in position in a lower die set ready for assembly in a badge making operation;

FIG. 9 is a fragmentary side elevational view similar to FIG. 8 but with portions shown in cross-section illustrating the die assembly after a first downstroke of an operating cycle has been commenced;

FIG. 10 is a fragmentary side elevational view with portions shown in cross-section similar to FIG. 9 but illustrating the die assembly in a position after the formation of a finished badge has been completed;

FIG. 11 is a fragmentary cross-sectional view of a lower portion of the lower die set illustrating a portion of a badge ejector assembly of the badge making machine; and FIG. 12 is a schematic diagram of an electrical system for controlling and operating the automatic badge making machine of the present invention.

DESCRIPTION OF A PREFERRED EMBODIMENT OF THE INVENTION

Referring now more particularly to the drawings, therein is illustrated a new and improved automatic button or badge making machine 20 constructed in accordance with the features of the present invention and especially designed to produce finished buttons or badges 22 (FIG. 11) from a plurality of badge parts comprising a pin back 24 (FIG. 8), a metal shell 26, a piece of artwork 28 and a clear plastic cover piece 30.

The badge making machine 20 includes a base 32 having a metal bottom wall 34 supported on a plurality of rubber or plastic feet 36. The base 32 also includes an upwardly extending peripheral edge wall 38 integrally joined with a horizontal upper wall section 40 preferably formed of molded resinous plastic material. A recessed front wall section 42 extends upwardly of a rear edge of the upper wall section 40 of the base 32 and is integrally joined with a pair of upstanding sidewalls 44 of a housing 46 for enclosing many of the operating components of the automatic badge making machine.

The housing 46 includes an integrally formed upstanding rear wall 47 joining a rearward portion of the base 32 and parallel of the recessed front wall segment 42. Each sidewall 44 of the housing 46 includes a forwardly projecting sidewall portion 48 adjacent an upper end portion and extending outwardly of the recessed front wall segment 42 and an upper wall 50 is integrally joined to the sidewall portions 48 and the upper end of the recessed front wall segment 42 to define the upper extremity of a work area 52 defined on the bottom by the wall 40 and on the rear by the recessed front wall 42. The housing 46 is closed at the upper end by a dome-like cap 54 having a top wall 56 and integrally formed, downwardly and outwardly sloping opposite sidewalls 58, a front wall 60 and a rear wall 62, all of these walls being connected at their lower edges with the upper edges of the housing 46 to provide a tight enclosure.

SAFETY COVER SYSTEM

In accordance with the present invention, the badge making machine 20 includes a protective safety cover 64 movable between a lower safety position (FIG. 1) for enclosing the work area 52 and an upper open position (FIG. 3) for permitting access to the work area for initially introducing the badge parts and for removing a finished badge 22 after a badge making operation or cycle has been completed. The safety cover 64 is formed of clear plastic material to permit viewing of the work area 52 when the cover is closed and includes a front wall 66 and a pair of opposite sidewalls 68 extending rearwardly thereof.

Each sidewall 68 of the safety cover 64 is provided with an outwardly extending rib 70 along a rearward edge and the ribs are slidably disposed in respective guide ways or tracks 72 (FIGS. 3 and 6) provided on the sidewalls 44 of the housing 46 for guiding the cover 64 during vertical movement between upper and lower positions. When the safety cover 64 is moved upwardly to the open position as shown in FIG. 3 to provide access to the work area 52, the cover may be retained in the open position by engagement to the lower end of the ribs 70 on a shoulder formed by a widened upper end portion 72a of the guideways 72. When the safety cover 64 is moved up to the open position and released at the upper end of the guide tracks 72, the weight thereof causes the safety cover to tilt forwardly as shown in FIG. 3 and the lower end of the ribs 70 project into the widened portions 72a at the upper end of the guide ways to retain the cover in the open position. The safety cover 64 is easily lowered to the "safe" position (FIG. 1) by tilting the cover rearwardly and letting the cover slide downwardly to enclose the work area 52.

DIE ASSEMBLY

The automatic badge maker 20 includes a die assembly 74 positioned in the work area 52 for forming the badge parts 24, 26, 28 and 30 into a finished badge or button 22. The die assembly 74 includes a lower die set 76 supported from the base 32 and an upper die set 76 supported for relative movement toward and away from the lower die set on the lower end of a ram 80. The ram is supported for movement along a vertical axis centered above the base 32.

The lower die set 76 includes a fixed central die member 82 mounted on a base plate 84 supported on a pair of legs 86 extending upwardly of the base 34. The central die member 82 includes a center recess 88 in the upper end surface dimensioned to hold a pin-back portion of the badge part 24 placed therein and includes a flat, annular, horizontally extending ring surface 90 around the central recess 88 for supporting the outer periphery of the badge part 24 when placed with the pin-back portion extending downwardly into the recess as best shown in FIGS. 8, 9 and 10.

The fixed central die member 82 is surrounded by a concentric, annular movable die member or outer die ring 92 which is movable vertically relative to the central die and which is supported on a pair of upstanding, diametrically spaced apart guide pins 94 mounted on bosses 96 carried on the base 34 as shown in FIGS. 5 and 8. The die ring 92 is resiliently biased upwardly from the bosses 96 by coil springs 98 carried on the pins 94 below the die ring. As shown in FIG. 8, the die ring 92 is formed with an upwardly facing, lower die groove 100 having a diameter greater than the inside diameter of the die ring and dimensioned to support the metal shell 26 of a badge when placed in the lower die set 76 after a pin-back 24 is first placed on the fixed central die member 82. The metal shell 26 has a downturned peripheral flange with an inside diameter greater than or equal to the outer diameter of the fixed central die 82 when the shell is undeformed as initially placed in the die with the edge flange facing downwardly as shown. The lower die ring 92 is also provided with an upwardly facing, open upper die recess or groove 102 having a diameter greater than and spaced above the lower die groove 100 in to support the circular badge parts 28 and 30, when the parts are initially placed in the lower die set 76 as shown in FIG. 8.

Relative vertical movement between the lower central die member 82 and the outer lower die ring 92 is controlled by a horizontal reciprocating bar stop 104 which extends on a diametrically transverse axis relative to the die members through a transverse slot 106 provided at a lower level in a base portion of the central die 82 (FIGS. 8–11). The bar stop 104 is formed with a pair of apertures 108 spaced apart on diametrically opposite sides of the lower central die 82 and a pair of stop pins 110 spaced apart by an equal distance are mounted on the outer die ring 92 to depend downwardly therefrom for operational association with the apertures 108 of the bar stop 104.

Referring to FIG. 8, when the bar stop 104 is positioned in a first position as shown with the apertures 108 aligned with the stop pins 110 the outer die ring 92 can move downwardly relative to the central die member 82 and the stop pins 110 are then extended into the apertures 108 (FIG. 9) without interference from the stop bar 104. When the stop bar is moved horizontally to a second position toward the rear of the housing 46 as shown in FIG. 10, the apertures 108 are moved out of registration with the stop pins 110 and the stop pins are then engageable with an upper face of the stop bar 104 preventing any substantial downward relative movement of the outer die ring 92 on the lower central die 82. Thus, whenever the stop bar 104 is in the first position of FIGS. 8 and 9, the outer die ring 92 is relatively movable downwardly on the central die member 82 against the upward force of the bias springs 98, but when the stop bar 104 is moved to the second or stopping position of FIG. 10, the upper die ring 92 is stopped against downward movement relative to the central die member 82.

Reciprocal movement of the bar stop 104 is controlled by a lever 112 mounted on a pivot pin 114 and activated by a cam 116 mounted on a cam shaft 118. The cam 116 has a continuous track or groove 120 formed in a side face thereof and a cam follower pin 122 on the upper end portion of the lever 112 is engaged in the groove to pivot or rock the lever as the cam turns and thereby reciprocate the stop bar 104. The cam shaft 118 is driven by a gear 124 carried thereon which is driven by a pinion gear 126 of half the pitch diameter thereof mounted on a motor driven shaft 128 driven by a reversible, DC powered electric motor 542. Accordingly, for each revolution of the motor driven shaft 128, the cam shaft 118 rotates only one-half a revolution and a two to one speed ratio is provided between the motor driven shaft and the cam shaft.

The cam 116 and cam track 120 therein is shaped so that the lever 112 and the stop bar 104 remain stationary for the first one-half revolution of the cam shaft 118 during an operating cycle. During a second half-revolution of the cam 116, the lever 112 is pivoted in a clockwise direction from the position of FIGS. 8 and 9 to the position of FIG. 10 and then back in a counterclockwise direction to the original position at the end of the second half-revolution of the cam shaft when the operating cycle is completed. It should also be noted that the cam 116 is formed with minimum radius portion of the cam track 120 for a sizeable segment of the track defined in the second half-revolution of cam rotation so that the lever 112 and the stop bar 104 remain in a dwell position of FIG. 10 for a substantial period of time during the later portion of an operating cycle.

The upper die set 78 of the die assembly 74 includes an inner or central die member 130 fixedly secured to the lower end of the vertically reciprocal ram 80 and having an outside diameter substantially equal to the inside diameter of the upper die groove 102 in the lower, outer die ring 92. The inner die member 130 is formed with an upwardly extending shallow recess 132 in a lower face and the recess is provided with a downwardly and outwardly sloping frustoconical, annular peripheral edge portion 134 (FIG. 8) designed to cam the badge parts 28 and 30 to fold around the peripheral edge portion of the metal shell 26 when the upper and lower die sets are engaged as shown in FIGS. 9 and 10 while forming a badge.

The upper die set 78 includes an outer die ring 136 mounted in coaxial alignment with the central die member 130 and mounted for vertical relative movement with respect thereto during an operating cycle. The die ring 136 includes an inner, downwardly protruding annular shoulder 138 on the lower face which is dimensioned to seat within the upper outer groove 102 of the lower die ring 92 when the upper die set 76 and lower die set 78 are pressed together during a badge making operation as shown in FIGS. 9 and 10.

The upper central die member 130 includes a cylindrical upper die plate 140 at the upper end abutting the lower end of the ram 80 and a pair of coil springs 142 (FIG. 6) on diametrically opposite sides of the central die member 130 extend downwardly of the upper die plate 140 to bias the die ring 136 downwardly relative to the inner die member 130 of the upper set. The die ring 136 includes an inwardly extending annular rib 144 at the upper end of the central bore for engaging a recess or shoulder 146 (FIG. 10) on the central die member 130 to limit the amount of relative downward travel of the die ring on the central die.

A transverse reciprocally movable bar stop 148 extending diametrically across the upper die set 78 is mounted in a transverse slot 150 in the die member 130 at a level just below the upper die plate 140. The bar stop 148 is biased toward the right as viewed in FIGS. 8, 9 and 10 into a stopping or first position by a coil spring 152 seated in the transverse slot 150 and acting between a mounting screw 154 which secures the die member 130 on the ram 80 an edge 156 provided in a slot formed in the bar stop. The bar stop 148 is also provided with a pair of depending, spaced apart stop pins 158 adapted to engage the upper end of the outer die ring 136 when the stop bar 148 is in the stopping position and thereby prevent relative upward movement of the die ring 136 on the central die member 130. When the bar stop 148 is moved toward the left into a release or unlocked position as shown in FIG. 10, the stop pins 158 are positioned to be out of engagement with the upper end surface of the outer die ring 136 and thus permit the outer die ring to ride upwardly relative to the central die member 130 until the upper surface of the outer die ring engages the underside of the stop bar 148 as shown in FIG. 10. The bias springs 142 are effective to return the die ring 136 downwardly on the central die member 130, after upward force on the die ring is relaxed, and the bar stop bias spring 152 is again effective to return the bar stop 148 to the stopping position of FIGS. 8 and 9.

Movement of the bar stop 148 toward the left hand release or unlocked position (FIG. 10) is controlled by a vertically upstanding rod cam 160 having a lower end connected to the lower stop bar 104 and an upper end portion sloping inwardly toward the housing 46. As the upper die set 78 is moved on a downstroke by the ram 80, the inner end of the upper stop bar 148 engages the upper end portion of the rod cam 160 whenever the lower stop bar 104 is in the outer or stop position as shown in FIG. 10 and this engagement biases the upper stop bar 148 outwardly toward the left from the stop position of FIG. 8 during the time that the upper stop bar is in contact with the rod cam 160. When the die set 78 is returned upwardly on an upstroke of the ram 80, the upper stop bar 148 eventually moves above the level of the rod cam 160 and then the bias spring 152 is effective to return the upper stop bar to the stopping position as shown in FIGS. 8 and 9, again locking the die ring 136 and the central die member 130 to move together in unison without relative vertical movement.

OPERATIONAL CYCLE OF THE BADGE MAKING MACHINE

An operational cycle of the die assembly 74 may be commenced after a set of the badge parts 24, 26, 28 and 30 are placed in the lower die set 76 in the order as shown in FIG. 8. After loading of the parts into the dies, the safety cover 64 is lowered to the safe position (FIG. 1) to enclose the work area 52, and thereby actuate a safety switch 524 having an operator 525 extending into a lower end of one of the guide tracks 72 (FIGS. 3 and 6). When the switch 524 is thus actuated by the safety cover 64 a circuit 500 (FIG. 12) is enabled to permit the machine 20 to commence a cycle of operation. An activate button 534 provided on a control panel 164 (FIG. 1) on the front wall 60 of the housing cap member 56 is then depressed to initiate a badge making cycle of operation. As an added safety feature, if the safety cover 64 is the upper position as shown in FIG. 3, direct access to the activate button 534 is greatly inhibited so that it is still unlikely that the die assembly 74 will be energized even if the switch 524 malfunctions and becomes stuck in a closed position.

Upon depression of the activate button 534, the upper die set 78 is moved downwardly by the ram 80 on a first downstroke of the cycle. During the first downstroke, the lower stop bar 104 is maintained in the position of FIG. 8 and the upper stop bar 148 does not engage the cam rod 160. When the upper and lower outer die rings 136 and 92 engage one another as shown in FIG. 9, they both move downwardly together a short distance relative to the lower fixed die member 82 until reaching the bottom of the downstroke. As this occurs, the outer periphery of the upper two badge parts 28 and 30 are folded downwardly around the outer edge of the metal badge shell 26 by the action of the conically-shaped, recess edge surface 134 in the upper central die member 130.

A first upstroke is then commenced by the ram 80 to move the upper die set 78 away from the lower die set 76. As the first upstroke proceeds, the bias springs 98 are effective to move the lower die ring 92 upwardly until an inner rib 93 (FIG. 10) at the bottom edge of the die ring engages a groove 83 (FIG. 9) on a lower edge surface of the central die member 82 to limit the amount of upward relative travel of the lower die ring 92 on the central die member 82. As the die ring 92 travels further upwardly the depending, lower peripheral edge of the badge parts 28 and 30 are contained in the lower die groove 100 which has substantially the same diameter as the inside diameter of the upwardly retreating upper die ring 136.

After the first upstroke of an operating cycle is completed, the cam 116 causes the lower stop bar 104 to move toward the left (FIG. 10) to the stopping position wherein the lower die members 82 and 92 are locked against relative vertical movement by the stop pins 110 which engage the upper surface of the lower stop bar 104. At the same time, the rod cam 160 is moved outwardly into an operative position for engaging the upper stop bar 148 as the ram 80 moves the upper die set 78 downwardly on a second downstroke of an operational cycle.

As the second downstroke proceeds, the upper stop bar 148 engages the cam rod 160 and is moved toward the left (FIG. 10) into the released or unlocked position wherein the lock pins 158 move out of registry with the upper surface of the upper die ring 136. This permits the upper die ring 136 to ride upwardly relative to the upper central die member 130 when engagement of the die ring 136 with the lower die ring 92 occurs and as the upper die member 130 thereafter continues downwardly on the second downward stroke of the cycle to the bottom, the lower peripheral edges of the badge parts 28 and 30 are cammed inwardly by the rounded groove surface of the lower die groove 100 and are folded or tucked in between the outer edge of the pin back 24 and the metal shell 26 to complete or finish the formation of a badge 22 (FIGS. 10 and 11).

On a second upstroke of an operating cycle the upper die set 78 is moved upwardly to an upper rest position in readiness for the next badge making operation and as this occurs the cam 116 causes the lower stop bar 104 to move to the right (FIG. 8) to an unlocked position, while the upper stop bar 148 is returned to the right by the inner bias spring 152 to the stopping or locked position.

BADGE EJECTOR ASSEMBLY

After a badge 22 has been assembled from a set of badge parts 24, 26, 28 and 30, the safety cover 64 is manually moved upwardly to the open position of FIG. 3 permitting access to the work area 52 for removal of the completed badge 22 from the lower die set 76. In order to assist in the removal of a completed badge 22, the automatic badge making machine 20 includes a badge ejector assembly 164 mounted on the base 32 forwardly of the lower die set 76. The badge ejector assembly 164 includes an ejector button 166 having a horizontal upper fingerpiece and a pair of depending support sleeves 168 slidably mounted on support posts 170 extending upwardly from the base plate 34 adjacent a forward edge portion (FIGS. 6 and 8). The sleeves 168 are biased upwardly by coil springs 172 (FIG. 8) mounted on the posts 170 on opposite sides of a central tang 174 depending downwardly of the fingerpiece between the sleeves 168. The lower end of the tang 174 engages a forward end of a lever 176 pivotally supported intermediate the ends on an axle 178 and having a rearward end engaging an ejector pin 180 slidably mounted in a vertical bore 182 provided in the fixed central die member 82 of the lower die set 76 (FIG. 11). A lower end portion of the ejector pin 180 extends downwardly through an aligned bore 182 (FIG. 11) provided in the base plate 84 to engage the lever 176. The ejector pin is biased downwardly of the die member 82 by a coil spring 184 and washer 186 so that the upper end portion does not project above the die surface 90 until the ejector button 166 is depressed.

RAM SUPPORT AND DRIVE MECHANISM

The ram 80 is supported for reciprocal movement in a bearing 188 carried in a support sleeve 190 in coaxial alignment with the die assembly 74 adjacent the upper edge of the work space 52. The hollow sleeve is fixedly mounted on a horizontally extending upper end segment 192 of an L-shaped chassis member 194 (FIG. 8) having a vertical leg 196 extending downwardly and welded to the bottom plate 34. The vertical leg 196 is provided with a vertically upstanding centrally positioned slot 198 in order to accommodate the rod cam 160 and the lower bar stop 104 which projects outwardly through the slot to engage the lower die set 76.

The chassis member 194 is made from relatively thick metal plate and forms a transverse member extending between a pair of parallel, upstanding side plates 200 (FIGS. 4, 5, 6, 7 and 8) secured at the lower edge to the base plate 34. The side plates 200 are also formed of relatively thick metal and serve to support many of the components of the badge making machine 20 within the outer housing 46 including a reversible DC drive motor 542 and a relay coil 530. Suitable bearings are provided on the side plates 200 for journalling the motor driven shaft 128, the cam shaft 118 and an upper crankshaft 202 for driving the ram 80. All of these shafts extend transversely between the chassis side plates 200.

As previously indicated, the motor driven shaft 128 drives the cam shaft 118 at half the speed thereof by virtue of an intermeshing pinion 126 and gear 124 and accordingly the cam shaft turns one revolution for every two revolutions of the motor driven shaft. The motor driven shaft 128 is provided with a crank arm 204 mounted on an end portion of the shaft opposite the drive motor 542, and the crank arm 204 is pivotally connected by a pin 206 to the lower end of an elongated connecting link 208 having a pin 210 at the upper end pivotally connected to the outer end of a rocker arm 212 mounted on the crankshaft 202.

The mechanical interconnection between the motor driven shaft 128 and the crankshaft 202 results in the crankshaft 202 being driven to rock back and forth two times in a precise angular amount around its longitudinal axis for each complete revolution of the motor driven shaft 128. The angular rocking action of the crankshaft 202 is coupled to reciprocate the ram 80 through an operational cycle comprising two downstrokes and two upstrokes of the desired length by means of a pair of rocker arm assemblies 214 secured to the crankshaft 202 inside of the chassis side plates 200 as shown in FIG. 6. At the upper end, each rocker arm assembly 214 is pivotally interconnected by a pin 216 to a short drive link 218. The short drive links 218, in turn, are spaced on opposite sides of the ram 80 at the upper end thereof and are pivotally interconnected to the ram by a transverse cross pin 220.

The interconnecting mechanical linkage as just described between the motor driven shaft 128 and the ram 80 is strong to provide the needed force to close the die assembly 74 to form the badges 22. The base plate 34 and the chassis members 194 and 200 are likewise strong to support the mechanical drive mechanism and other components of the badge making machine 20. At the lower rearward corner of the chassis, a relatively heavy, metal cylinder 222 is provided to extend transversely, between the heavy side plates 200 in order to provide a counterweight to prevent the machine 20 from tipping over in forward direction during badge making operations because of the reciprocal movements of the ram 80 and the upper die set 78.

CIRCUIT DESCRIPTION FOR BADGE MAKING MACHINE

With reference now to FIG. 12, there is shown a control circuit generally designated as 500 for controlling the operation of the badge making machine 20. In accordance with important features of the present invention, the circuit 500 assures safe operation of the machine 20 by disabling the machine when the safety cover 64 is in its raised position (FIG. 3). In addition, the circuit 500 detects an increasing load condition in the event that the ram 80 is blocked or jammed and automatically reverses the direction of movement of the ram 80 to provide an additional safety feature and prevent damage to the mechanism of the machine 20.

In general, the circuit 500 includes a DC operating section 501 and a power supply section 502 including a conventional plug connector 504 for connection to a source of nominal 110 volt 60 hertz electrical power. A main power switch 506 controls the application of current to a pair of parallel connected primary windings 508 and 510 of a power transformer 512. A power on indicator lamp 514 is connected in series with a current limiting resistor 516 across the power supply terminals. A metal oxide varistor 518 is also connected across the power supply terminals provides transient protection.

A pair of series connected secondary windings 520 and 522 of the transformer 512 are connected through the safety switch 524 to the input terminals of a full wave rectifier bridge 526. The safety switch 524 prevents the application of power to the rectifier bridge 526 in its normally open condition when the safety cover 64 is open (FIG. 3).

As seen in FIG. 6, the safety switch 524 comprises a microswitch having an actuating arm 525 positioned in one of the guide tracks 72 of the housing 64. When the safety cover 64 is in its raised position for permitting access by the user to the badge forming die assembly 74 the switch 524 is in its normally open position. Thus, the user cannot inadvertently operate the ram 80 and the possibility of injury to the user and/or other damage is prevented. When the safety cover 64 is lowered in the tracks 72 to the closed position, the lower edge portion of the safety cover moves the actuator arm 525 and operates the safety switch 524 to the closed position. As a result, direct current is applied from the output of the rectifier bridge 526 for energizing the DC operating section 501 of the circuit 500.

In FIG. 12 the components of the circuit 500 and the DC operating section 501 are shown in a non-energized condition. When the power switch 506 and the safety switch 524 are closed, the DC section 501 is placed in a standby condition ready to carry out a badge making operation by the energization of the winding 528 of a control relay 530. Winding 528 is in series with a current sensitive, manually reset circuit breaker 532 across the DC supply terminals of the rectifier bridge 526. Energization of winding 528 results in closing of normally open relay contacts 528A, 528B and 528C and the opening of normally closed relay contacts 528D, 528E and 528F in preparation for initiation of a cycle of operation.

A cycle of operation is initiated by momentarily depressing a start button 534 (FIGS. 1 and 1A) accessible at the control panel 164. The "Actuate" button 534 includes a switch operating projection 536 (FIG. 5A) for operating a start switch 538 and a brake switch 540. As seen in FIGS. 5 and 5A, the switches 538 and 540 are microswitches having operating arms 539 and 541 respectively, and are both moved from the normally open condition to a switch closed condition by the projection 536 when the start button 534 is momentarily depressed.

Closing of the start switch 538 completes a circuit for energizing the drive motor 542. The driver motor 542 comprises a DC motor capable of operating in forward or reverse directions in dependence on the polarity of the voltage applied to the motor. The switch 538 connects one side 542A of the motor through a circuit breaker 532 to the relatively negative output terminal of the rectifier bridge 526. An opposite side 542B of the motor is connected through closed relay contacts 528C to the relatively positive output terminal of the rectifier bridge 526. As a result, the motor rotates in the forward direction.

Control of the circuit 500 and the motor 542 during the remainder of a cycle of operation is controlled by a hold switch 544 and a reverse switch 546. These switches are mounted in a stack along with a counter switch 548 and are controlled by a motor driven cam 550 (FIGS. 7, 7A, 7B and 7C). The switches 544, 546 and 548 are microswitches and include operating arms 545, 547 and 549, respectively.

As described above, in each cycle of operation of the badge machine 20, the ram 80 moves down and returns up to its upper rest position twice. The switch operating cam 550 is mounted on the motor driven shaft 551 and rotates at a one to one ratio with the motor driven shaft 118. The ram 80 is driven from the motor driven shaft 128 which rotates at a two to one speed ratio with respect to the switch cam 550 mounted on the cam shaft 118. Consequently, during one complete 360 degree revolution of the switch cam 550, the motor driven shaft 128 turns through two revolutions and moves the ram 80 down and then up, two times in succession during a normal operating cycle.

In the rest or home position, the ram 80 is in its raised position and the cam 550 is at top dead center In this position, the operator arm 545 engages a hold cam lobe 552 to operate the hold switch 544 to open the contacts 544A and close the contacts 544B. The operator arm 547 engages a first reverse cam lobe 554 to operate the reverse switch 546 to open the contacts 546A and close the contacts 546B. A second reverse cam lobe 556 is offset 180 degrees around the switch cam 550. The operator arm 549 engages a counter cam lobe 558 to open the counter switch 546.

In the first segment of rotation of the motor 542 and the cam 550, the motor 542 is energized by momentary operation of the start switch 538 as described above. When the cam 550 rotates a small amount, the hold cam lobe 552 moves from beneath the operator arm 545 and the hold switch 544 is operated to close the contacts 544A and open the contacts 544B. The contacts 544A are in parallel with the start switch 538 and maintain a current path for continued energization of the motor 542 for operation in the forward direction after the start button 534 is released opening the start switch 538.

Rotation of the motor 542 and the switch cam 550 continues through a full cycle of operation corresponding to a complete revolution of the cam 550. At the end of the cycle, the hold switch 544 and the reverse switch 546 are operated by the cam lobes 552 and 554 to return the circuit 500 to the standby position. Opening of the contacts 544A discontinues energization of the motor. In addition, dynamic braking is accomplished when the contacts 544B close. The contacts 544B serve, together with the normally closed brake switch 540, to connect a brake resistor 560 in parallel with the motor 542 and the motor is stopped by back electromotive force.

A counter circuit 562 provides a count of operation cycles visible at a display at the front panel 164 of the badge making machine 20. The circuit 562 includes a battery power supply 564 for continuous energization of a solid state counter module 566 so that the counter RAM memory is maintained independent of operation of the power switch 506. The counter switch 548 is connected between the count signal input terminal of the module 566 and the negative side of the power supply to increment the count for each revolution of the switch cam 550 when switch 548 is opened and reclosed by the cam lobe 558.

In the event of a jam or block of the die assembly 74 and the ram 80, the circuit 500 senses an overload condition and reverses the movement of the ram 80 automatically to clear the jam. If more than a predetermined force is required to move the ram 80, the current drawn by motor 542 increases. The current responsive circuit breaker 532 then opens interrupting the path of current to the motor. Simultaneously, the circuit path for energization of the relay winding 528 is interrupted and the relay contacts return to their deenergized condition. The relay contacts serve to reverse the polarity of the voltage applied to the motor and reverse its direction of movement.

The contacts 528F close to connect the side 542A of the motor 542 to the relatively negative side of the rectifier bridge 526. The contacts 528E close to connect the opposite side 542B of the motor to the relatively positive side of the rectifier bridge 526. Reverse operation of the motor 542 continues until either the lobe 554 or the lobe 556 of the cam 550 operates the reverse switch 546. The contacts 546A open to interrupt the circuit path for energization of the motor 542. Simultaneously, the contacts 546B close to cooperate with the brake switch 540 in connecting the brake resistor 560 across the motor 542.

If the reverse operation is triggered in the first half of a revolution of the cam 550, the lobe 554 interrupts the reverse operation in the top dead center position of the cam 550. When the circuit breaker 532 is manually reset by pressing a pushbutton 532A on the panel 164 of the housing 46, the circuit is returned to the standby position ready to begin another cycle of operation.

If the reverse operation is triggered in the second half of a revolution, the second reverse lobe 556 interrupts the reverse operation in a cam position diametrically opposed to top dead center and with the ram in its raised position midway through a cycle of operation. In this case, the power switch 506 is opened to disconnect the circuit from the power supply, and the circuit breaker is manually reset. When the power switch is then turned on, the second half of a cycle of operation takes place with the motor 542 operated in the forward direction by the closed contacts 544A of the hold switch 544. At the end of the half cycle, the circuit is returned to the standby position with the cam 550 in the top dead center position.

Although the present invention has been described in terms of a preferred embodiment, it is intended to include those equivalent structures, some of which may be apparent upon reading this description, and others that may be obvious after study and review.

What is claimed and sought to be secured by Letters Patent of the United States is:

1. An automatic badge maker comprising:
   first and second relatively movable dies;
   drive means for relatively moving said first die in an operating cycle comprising a plurality of successive strokes toward and away from said second die to form a badge between facing surfaces of said dies;
   a housing for safely enclosing said dies and said drive means including an access opening for loading and unloading said dies with badge parts and a finished badge, respectively;

safety cover means movable between an open position relative to said access opening for loading and unloading said dies and a closed position for completely closing said access opening during an operating cycle to prevent injury to persons and/or objects around said dies and drive means; and safety means for preventing operation of said drive means whenever said safety cover means is in said open position.

2. The automatic badge maker of claim 1 wherein:
said drive means includes electric motor means;
said safety means includes a switch for supplying power for energizing said electric motor means, and wherein
said safety cover means is operable to open said switch when said cover means is in said open position.

3. The automatic badge maker of claim 2 wherein:
said safety means includes a guide track for guiding said cover means between said open and closed position; and
said switch is positioned in said guide track for activating engagement by said cover means when in said closed position to permit said motor means to be energized.

4. The automatic badge maker of claim 3 including:
means for retaining said cover means in said open position at an end of said guide track; and
said safety means includes an activating switch for energizing said motor means to commence an operating cycle, said switch being mounted in a position on said badge maker that is covered by said cover means while in said open position and exposed from said cover means while said cover is in said closed position for activation of said switch to commence an operating cycle of said motor means.

5. The automatic badge maker of claim 2 wherein:
said first and second dies each include a pair of relatively movable inner and outer die members; and
cam operated means driven by said motor means for alternately locking said pairs of die members against relative movement during an operating cycle for making a badge from said badge parts.

6. The automatic badge maker of claim 5 wherein:
said operative cycle comprises a series of strokes of at least one of said dies toward and away from the other; and
said cam operated means includes first means for locking said one pair of die members against relative movement during a first stroke toward said second pair of die members second means for and locking said second pair of die members against relative movement during a second stroke of said one pair toward said second pair.

7. The automatic badge maker of claim 6 wherein:
said cam operated means includes first means for unlocking said one pair of die members for permitting relative movement during said second stroke of said cycle toward said second pair of die members and second means for unlocking said second pair of die members for permitting relative movement during said first stroke.

8. The automatic badge maker of claim 7 wherein:
said drive means includes a reciprocating member driven by a first shaft for moving said one pair of die members toward and away from said second pair of die members; and
said cam operated means includes a cam on a second shaft drivingly interconnected to said first shaft.

9. The automatic badge maker of claim 8 wherein:
said first shaft is driven by said motor means to make two revolutions for driving said reciprocating member on series of strokes toward and away from said second pair of die members while said second shaft makes one revolution to drive said cam.

10. A machine for making badges from badge parts, said machine comprising:
a ram movable away from a rest position on a working stroke;
badge part forming die means mounted on said ram;
a drive motor;
a motor output shaft rotationally driven by said motor;
drive coupling means interconnecting said output shaft and said ram for moving said ram in response to rotation of said output shaft;
a control circuit connected between a power source and said motor for controlling the application of power to said motor;
switch means in said control circuit for operating said motor alternatively in forward and reverse directions;
load detecting means responsive to the load at said badge part forming die means; and
means connected between said detecting means and said switch means for reversing the direction of operation of said motor in response to a predetermined detected load.

11. A machine as claimed in claim 10, said motor comprising a DC motor, and said switch means including first switching means connected to said detecting means for reversing the polarity of voltage applied to said motor in response to the predetermined detected load.

12. A machine as claimed in claim 11, said detecting means comprising current sensing means connected in series circuit relationship with said motor.

13. A machine as claimed in claim 12, said detecting means comprising a circuit breaker, and said first switching means comprising a relay connected to said circuit breaker.

14. A machine as claimed in claim 11, further comprising a cam connected to said output shaft, and second switching means engageable with said cam for deenergizing said motor in a home position of said cam corresponding to said rest position of said ram.

15. A machine as claimed in claim 14 further comprising brake means connected to said second switching means for stopping ram in said rest position.

16. A machine as claimed in claim 15, said brake means comprising a brake resistor connected across said motor by said second switching means.

17. A machine as claimed in claim 14, said switch means including third switching means manually operable to energize said motor in a forward direction when said cam is in said home position.

18. A machine as claimed in claim 17, said switch means including fourth switching means operable by said cam to energize said motor in a forward direction when said cam is spaced from said home position.

19. A machine as claimed in claim 17, said drive coupling means including gear means for moving said ram through a plurality of said working strokes during one revolution of said cam away from said home position, and said cam including a plurality of lobes engageable with said second switching means at positions each corresponding to said rest position of said ram.

20. A machine for making badges from badge parts comprising:
a housing;
a work area defined by said housing accessible to a user of the machine;
a badge part forming die set in said work area;
motor drive means for forcing said die set together from a rest position in which said die set is parted;
a track defined by said housing;
a cover slidable in said track between a first position in which said work area is covered and a second position in which said work area is exposed;
a control circuit for applying power to said motor drive means; and
a switch in said track connected to said control circuit and engageable by said cover in said first position and spaced from said cover in said second position for disabling said control circuit when said cove is in said second position.

21. The machine of claim 20, said track extending in a cover movement direction that is at least partly vertical, said track including a stop upon which said cover rests in said second position.

22. The machine of claim 20, said control circuit including first switching means for deenergizing said motor drive means when said die set moves to said parted position.

23. The machine of claim 20, said control circuit including second switching means for energizing said motor drive means when said die set is in said parted position, said second switching means being manually operated.

24. The machine of claim 23, said second switching means including a manual actuator disposed on said housing in a region blocked by said cover when said cover is in said second position.

25. An automatic badge maker comprising:
first and second relatively movable dies;
drive means for relatively moving said first die in an operating cycle comprising a plurality of successive strokes toward and away from said second die to form a badge between facing surfaces of said dies, said drive means including electric motor means;
safety cover means movable between an open position for permitting access to a work area around said dies and a closed position for enclosing said work area during an operating cycle to prevent injury to persons and/or objects in said work area; and
safety means for preventing operation of said drive means whenever said safety cover means is in said open position, said safety means including a switch for supplying power for energizing said electric motor means and a guide track for guiding said cover means between said open and said closed position, said switch being positioned in said guide track for activating engagement when said cover means is in said closed position to permit said motor means to be energized and, said safety cover means being operable to permit opening of said switch when said cover means is in said open position.

26. The automatic badge maker of claim 25 including:
means for retaining said cover means in said open position at an end of said guide track; and
said safety means includes an activating switch for energizing said motor means to commence an operating cycle, said switch being mounted in a position on said badge maker that is covered by said cover means while in said open position and exposed from said cover means while said cover is in said closed position for activation of said switch of commence an operating cycle of said motor means.

27. The automatic badge maker of claim 25 wherein:
said first and second dies each include a pair of relatively movable inner and outer die members; and
cam operated means driven by said motor means for alternately locking said pairs of die members against relative movement during an operating cycle for making a badge from said badge parts.

28. The automatic badge maker of claim 27 wherein:
said operative cycle comprises a series of strokes of at least one of said dies toward and away from the other; and
said cam operated means includes first means for locking said one pair of die members against relative movement during a first stroke toward said second pair of die members second means for and locking said second pair of die members against relative movement during a second stroke of said one pair toward said second pair.

29. The automatic badge maker of claim 28 wherein:
said cam operated means includes first means for unlocking said one pair of die members for permitting relative movement during said second stroke of said cycle toward said second pair of die members and second means for unlocking said second pair of die members for permitting relative movement during said first stroke.

30. The automatic badge maker of claim 29 wherein:
said drive means includes a reciprocating member driven by a first shaft for moving said one pair of die members toward and away from said second pair of die members; and
said cam operated means includes a cam on a second shaft drivingly interconnected to said first shaft.

31. The automatic badge maker of claim 30 wherein:
said first shaft is driven by said motor means to make two revolutions for driving said reciprocating member on series of strokes toward and away from said second pair of die members while said second shaft makes one revolution to drive said cam.

* * * * *